United States Patent [19]
Horiuchi et al.

[11] Patent Number: 4,549,789
[45] Date of Patent: Oct. 29, 1985

[54] LIGHT BEAM DEFLECTOR EMITTING A PAIR OF OUTPUT LIGHT BEAMS ON PLANES INTERSECTING TO EACH OTHER

[75] Inventors: Shigenori Horiuchi; Takeru Shinohara, both of Yamanashi, Japan

[73] Assignee: Hoya Corporation, Tokyo, Japan

[21] Appl. No.: 462,897

[22] Filed: Feb. 1, 1983

[30] Foreign Application Priority Data

Feb. 3, 1982 [JP] Japan .................................. 57-14781

[51] Int. Cl.[4] .............................................. G07E 1/33
[52] U.S. Cl. ....................................... 350/358; 350/371
[58] Field of Search ........................ 350/358, 371-373

[56] References Cited

U.S. PATENT DOCUMENTS

| | | | |
|---|---|---|---|
| 3,609,009 | 9/1971 | Lohman et al. | 350/358 |
| 3,661,441 | 5/1972 | Uchida et al. | 350/358 |
| 3,713,721 | 1/1973 | Watson | 350/371 |
| 3,843,234 | 10/1974 | Dobrzhansky et al. | 350/358 |
| 3,897,152 | 7/1975 | Farmer et al. | 350/358 |
| 4,054,367 | 10/1977 | Eschler et al. | 350/358 |

FOREIGN PATENT DOCUMENTS 4732470  3/1969  Japan .................................. 350/358

OTHER PUBLICATIONS

Chrostowski et al, "Bistable Optical Switching Based on Bragg Diffraction", Optics Comm., 3-15-82, pp. 71-74.
Yano et al., "Tellurite Glass: A New Acousto-Optic Material", Jr. of App. Physics, 9-1971, pp. 3674-3676.

*Primary Examiner*—William H. Punter
*Attorney, Agent, or Firm*—Hopgood, Calimafde, Kalil, Blaustein & Judlowe

[57] ABSTRACT

In a light beam deflector comprising an acoustic medium supplied with an incident light beam along an optical axis to selectively emit a pair of first-order diffracted output beams and first and second transducers selectively energized by an electric signal to propagate first and second acoustic waves into the medium, respectively, the acoustic medium has a hexahedral shape defining an incident surface for the incident beam, an output surface opposite to the incident surface, and four side surfaces contiguous to the incident and the output surfaces. The first and the second transducers are laid on two adjacent ones of the side surfaces so that wave fronts of the first and the second acoustic waves intersect relative to each other at a substantially right angle in the medium. The incident beam is inclined to both wave fronts by the Bragg angle. A plane defined by one of the output beams and the optical axis intersects with another plane defined by the other output beam and the optical axis. Preferably, an acoustic absorber is covered on two side surfaces opposite to the above-mentioned side surfaces for the transducers.

4 Claims, 4 Drawing Figures

LIGHT BEAM DEFLECTOR EMITTING A PAIR OF OUTPUT LIGHT BEAMS ON PLANES INTERSECTING TO EACH OTHER

BACKGROUND OF THE INVENTION

This invention relates to a light beam deflector responsive to an incident light beam for emitting either a first or a second output light beam.

A conventional light beam deflector of the type described has been disclosed in U.S. Pat. No. 3,609,009 issued to Robert D. Lohman et al. The conventional light beam deflector comprises an acoustic medium and a first and a second electroacoustic transducer attached to the acoustic medium. In such a deflector, an incident light beam along an optical axis is deflected from the optical axis to be emitted as a first or a second output light beam in accordance with an acoustic wave selectively supplied from the first or the second transducer. As will later be described with reference to one of a few figures of the accompanying drawing, the conventional light beam deflector is disadvantageous in that isolation is not sufficient between the first and the second output light beam. In addition, the conventional light beam deflector requires precise working or machining and is, therefore, expensive.

SUMMARY OF THE INVENTION

It is an object of this invention to provide a light beam deflector in which isolation is excellent between a first and a second output light beam.

It is another object of this invention to provide a light beam deflector of the type described which can readily be manufactured and is inexpensive.

It is a further object of this invention to provide a light beam deflector of the type described, which is capable of deflecting a plurality of light beams having different wavelengths.

A light beam deflector to which this invention is applicable is supplied with an incident light beam for selectively emitting first and second output light beams. The deflector comprises an acoustic medium having an incident surface for the incident light beam and an output surface for the first and the second output light beams and acoustic wave supplying means coupled to the acoustic medium for supplying the acoustic medium with first and second acoustic waves having first and second acoustic wave fronts, respectively. According to this invention, the acoustic medium comprises a hexahedral body having the incident and the output surfaces and first, second, third, and fourth side surfaces laid between the incident and the output surfaces. The first side surface is contiguous to the second and the fourth side surfaces and opposite to the third side surface. The wave supplying means comprises producing means for selectively producing first and second electrical signals, a first electroacoustic transducer attached to the first side surface and responsive to the first electrical signal for propagating the first acoustic wave into the body, and a second electroacoustic transducer attached to the second side surface and responsive to the second electrical signal for propagating the second acoustic wave into said body to make the second acoustic wave front intersect with the first acoustic wave front at a substantially right angle.

DESCRIPTION OF THE PREFERRED EMBODIMENTS

Figure 1:
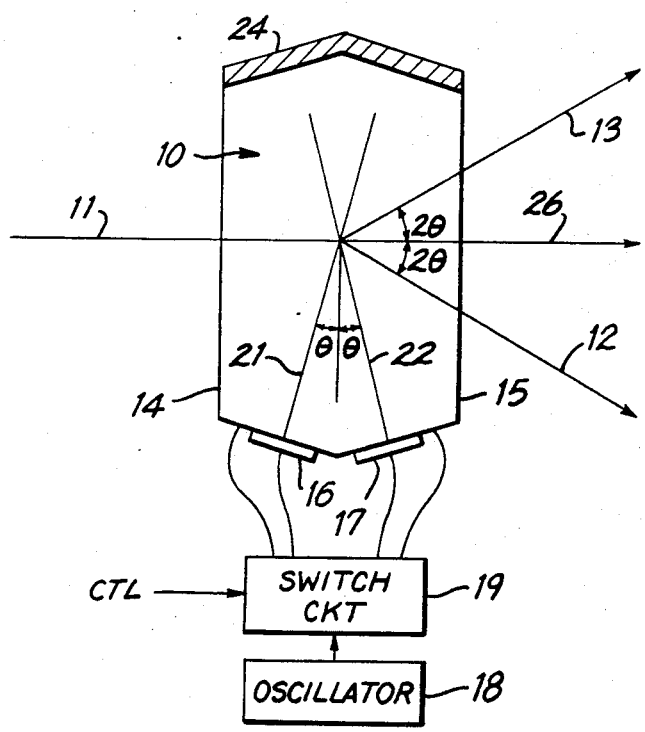
FIG. 1 is a schematic view for describing a conventional light beam deflector.

Referring to FIG. 1, a conventional light beam deflector is substantially equivalent to that disclosed in the above-referenced U.S. Patent. The light beam deflector comprises an acoustic medium 10 responsive to an incident light beam 11 for selectively producing or emitting a first or a second output beam 12 or 13. The acoustic medium 10 has a hexagonal shape in cross section and an incident surface 14 for the incident light beam 11 and an output surface 15 which is opposite to the incident surface and which is for leaving the first and the second output light beams 12 and 13. The incident light beam 11 is incident to the incident surface 14 along an optical axis. The acoustic medium 10 is transparent to the incident and the output light beams and can propagate acoustic waves, as will presently become clear. The acoustic medium 10 may be water, quartz, or acousto-optic crystal.

First and second electroacoustic transducers 16 and 17 are mounted on first and second side surfaces which are adjacent to each other and contiguous to the incident and the output surfaces 14 and 15, respectively. The first and the second electroacoustic transducers 16 and 17 are selectively supplied with a radio frequency electrical signal from an oscillator 18 through a switch circuit 19. The switch circuit 19 is operable in response to a control signal CTL given from a control circuit (not shown) known in the art. As a result, the switch circuit 19 delivers the radio frequency electrical signal to the first or the second transducer 16 or 17 in accordance with the control signal CTL. Each of the first and the second transducers 16 and 17 propagates the acoustic wave into the acoustic medium 10. Thus, a combination of the transducers 16 and 17, the switch circuit 19, and the oscillator 18 serves to supply the acoustic waves to the acoustic medium 10. Herein, the acoustic wave emitted from the first transducer 16 may be called a first acoustic wave indicated by 21 while that emitted from the second transducer 17, a second acoustic wave indicated by 22. Each of the first and the second acoustic waves 21 and 22 has a wavelength corresponding to that of the radio frequency electrical signal.

In the illustrated deflector, an acoustic absorber 24 is attached to those side surfaces of the acoustic medium 10 which are opposite to the first and the second side surfaces, Now, it is assumed that the incident light beam 11 is supplied to the acoustic medium 10 along the optical axis while the first transducer 16 is energized by the switch circuit 19. Under these circumstances, the first acoustic wave 21 has a first acoustic wave front intersecting with the incident light beam 11 at the Bragg angle $\theta$, as described in the referenced U.S. Patent. Consequently, a part of the incident light beam 11 is deflected by an angle of $2\theta$ relative to the optical axis to cause a first-order diffracted beam as the first output light beam 12. An undiffracted, namely, a zeroth-order light beam 26 appears along the optical axis. Therefore, the zeroth-order light beam 26 is blocked by the use of a mask (not shown) in a usual manner. It is to be noted here that the other high-order diffracted or spurious light beams, such as a minus first-order diffracted light beam and the like, are also produced in addition to the first-order and the zeroth-order light beams. At any rate, the incident and the remaining light beams are all present in a common plane.

On the other hand, let the incident light beam 11 be deflected by the second acoustic wave 22 supplied from the second transducer 17 to the acoustic medium 10. As shown in FIG. 1, directions of the first and the second acoustic waves 21 and 22 are symmetrical with respect to a plane perpendicular to the optical axis. This means that the second acoustic wave 22 has a second acoustic wave front intersecting with the optical axis or the incident light beam 11 at the Bragg angle $\theta$. Accordingly, a part of the incident light beam 11 is deflected upwardly by an angle of $2\theta$ relative to the optical axis to cause a first-order diffracted light beam as the second output light beam 13 which is symmetrical with the first output light beam 12. The remaining light beams, such as a zeroth-order and a minus first-order light beam, are also produced together with the second output light beam 13. All of the second output light beam and the remaining light beams are present on the same plane as the first output light beam and the others.

Consideration should be directed to the fact that the minus first-order diffracted light beams related to the first and the second output light beams are symmetrical with the second and the first output light beams, respectively. More specifically, when the incident light beam 11 is deflected by the use of the first acoustic wave, the minus first-order diffracted light beam undesiredly appears in the same direction as the second output light beam and vice versa. Therefore, it is difficult to isolate the first and the second output light beams 12 and 13 without the minus first-order diffracted light beams accompanying the light beams 13 and 12, respectively. It is also difficult to apply the conventional deflector to an optical switch which is used in a light communication system and which requires excellent isolation.

Moreover, the acoustic medium 10 should be precisely processed to make both of the wave fronts intersect with the incident light beam 11 at the Bragg angle $\theta$. As shown in the art, the Bragg angle $\theta$ is determined by calculating a sine of $\theta$ which becomes equal to a wavelength of a light beam divided by a factor of twice a wavelength of an acoustic wave. In any event, the Bragg angle is dependent on the wavelengths of the light beam and the acoustic wave. The acoustic medium 10 is therefore changed in size, if the wavelength of the light beam is varied. This means that light beams having different wavelengths can not be deflected by the use of the conventional deflector.

Figure 2:
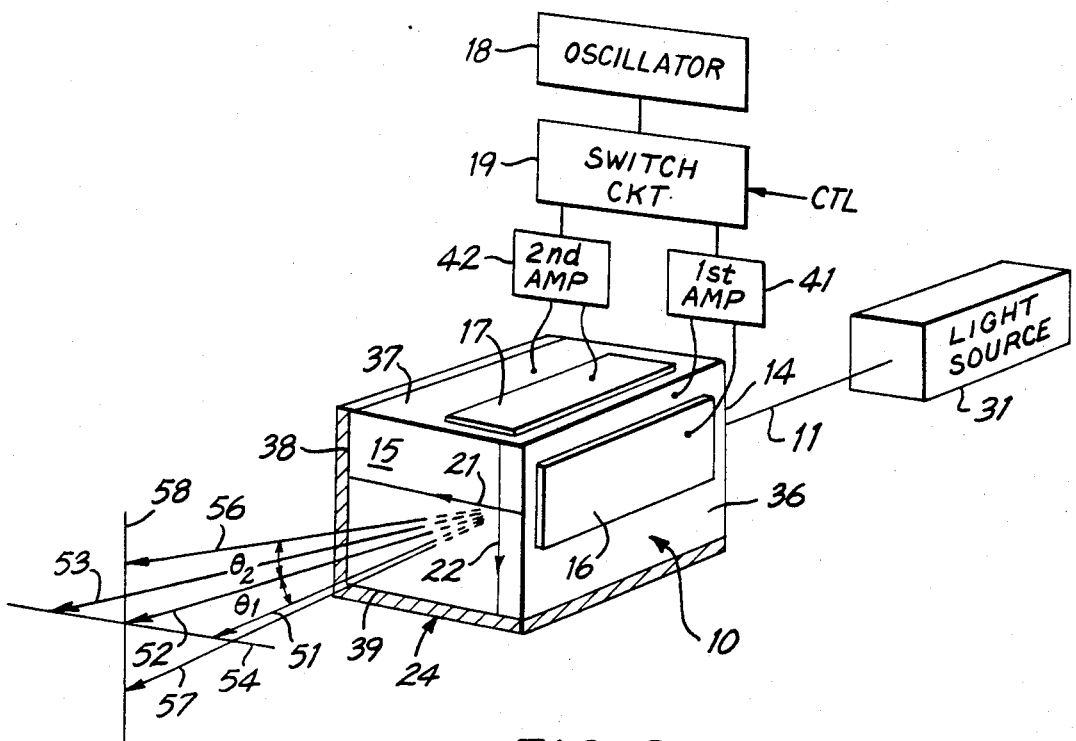
FIG. 2 is a perspective view of a light beam deflector according to a first embodiment of this invention.

Referring to FIG. 2, a light beam deflector according to a first embodiment of this invention comprises similar parts designated by like reference numerals and is for use in combination with a light source 31, such as a helium-neon gas laser, for emitting a light beam. The light beam is incident to the acoustic medium 10 as the incident light beam 11 in a manner to be described later. The illustrated acoustic medium 10 is of a parallelpiped having a size of $10 \times 10 \times 20$ mm and may be of tellurite glass transparent to the incident light beam 11. The acoustic medium 10 has a first surface for receiving the incident light beam 11, a second surface opposite to the first surface, and first, second, third, and fourth side surfaces 36, 37, 38, and 39 laid between the first and the second surfaces. As shown in FIG. 2, the first side surface 36 is adjacent to the second and the fourth side surfaces 37 and 39 and is opposite to the third side surface 38. In the example being illustrated, the first side surface 36 intersects with the second side surface 37 at a substantially right angle.

The first and the second electroacoustic transducers 16 and 17 are attached to the first and the second side surfaces 36 and 37, respectively, and are connected to first and second amplifiers 41 and 42, respectively. Each of the first and the second transducers 16 and 17 may be of a piezoelectric material, such as niobic acid lithium or the like. The first and the second amplifiers 41 and 42 are connected through the switch circuit 19 to the oscillator 18. The switch circuit 19 and the oscillator 18 are put into operation in a manner similar to those illustrated in FIG. 2. The first and the second amplifiers 41 and 42 serve to selectively supply a first and a second electrical signal to the first and the second transducers 36 and 37 in cooperation with the switch circuit 19 and the oscillator 18, respectively. Preferably, each of the amplifiers 41 and 42 has a high gain.

Responsive to the first and the second electrical signals, the first and the second electoacoustic transducers 16 and 17 selectively propagate the first and the second acoustic waves 21 and 22 in the directions of the third and the fourth side surfaces 38 and 39, respectively. The first and the second acoustic waves 21 and 22 have first and second acoustic wave fronts substantially parallel to the first and the second side surfaces 36 and 37, respectively. From this fact, it is readily understood that the first acoustic wave front intersects with the second acoustic wave front at a substantially right angle.

Figure 3:
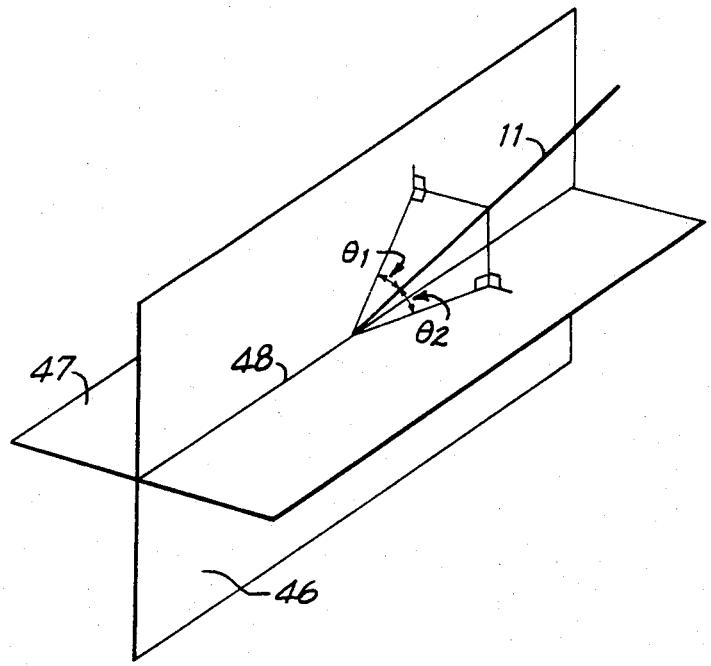
FIG. 3 is a view for describing a principle of this invention.

Temporarily referring to FIG. 3, the first and the second acoustic wave fronts of the first and the second acoustic waves 21 and 22 are depicted at 46 and 47, respectively, for a better understanding of this invention. The first and the second acoustic wave fronts 46 and 47 intersect to each other at a substantially right angle with a line 48 formed between the acoustic wave fronts 46 and 47. As illustrated with respect to the line 48, the incident light beam 11 is incident to both of the first and the second acoustic wave fronts 46 and 47 at oblique angles $\theta_1$ and $\theta_2$ each of which is substantially equal to the Bragg angle. Inasmuch as the Bragg angle is dependent on the wavelengths of both of the incident light beam 11 and the acoustic waves 21 and 22 as mentioned before, it is readily possible to supply the incident light beam 11 at the Bragg angle with respect to the first and the second wave fronts 46 and 47. The angles $\theta_1$ and $\theta_2$ can be controlled by moving the light source 31 by the use of a well-known angle adjusting mechanism (not shown). Thus, a combination of the light source 31 and the adjusting mechanism is operable to adjust the incident light beam 11 to the Bragg angles.

Turning back to FIG. 2, the third and the fourth side surfaces 38 and 39 which are opposite to the first and the second side surfaces 36 and 37, respectively, are covered with the acoustic absorber 24 of, for example, aluminum. Thus, the acoustic absorber 24 serves to absorb the first and the second acoustic waves 21 and 22 lest that any reflected waves return back in the directions of the first and the second side surfaces 36 and 37.

Referring to FIGS. 2 and 3, operation will be described about the illustrated light beam deflector. Let the first electroacoustic transducer 16 alone be energized by the first electrical signal supplied from the oscillator 18. The incident light beam 11 is incident to the first wave front 46 at the Bragg angle $\theta_1$ along the optical axis, as illustrated with reference to FIG. 3. Accordingly, the incident light beam 11 is partly diffracted by the first acoustic wave 21. As a result, a first-order diffracted light beam 51 is produced as the first output light beam from the output surface 15.

Practically, it is impossible to completely satisfy the above-mentioned condition relating to the Bragg angle because the incident light beam 11 is inevitably scattered. Spurious light beams inescapably appears together with the first-order diffracted beam 51. In FIG. 2, a zeroth-order light beam 52 which transmits or permeates the acoustic medium 10 is shown as one of the spurious light beams along with a minus first-order diffracted light beam 53 symmetrical with the first-order diffracted light beam 51. The zeroth-order light beam 52 defines the optical axis. The other diffracted light beams are omitted from this figure.

It is mentioned here that the first-order and the minus first-order diffracted light beams 51 and 53 and the zeroth-order light beam 52 are present on a first plane, as suggested by a line 54 on the lefthand side of FIG. 2. Namely, the first plane 54 is determined by the first-order diffracted light beam 51 and the optical axis defined by the zeroth-order light beam 53.

Likewise, the first-order diffracted light beam 56 appears as the second output light beam when the second transducer 17 alone is energized by the second electrical signal. Simultaneously, a zeroth-order light beam depicted at the same reference numeral 52 and a minus first-order diffracted light beam 57 appear as spurious light beams. These light beams 56, 52, and 57 are also present on a second plane, as suggested by a line 58. The second plane 58 determined by the first-order diffracted light beam 56 and the optical axis is substantially orthogonal to the plane 54.

From this fact, it is readily understood that the minus first-order diffracted light beams 53 and 57 appear on the different planes relative to each other when the first and the second electro-acoustic transducers 16 and 17 are selectively energized. This means that no spurious light beams appear on a specific plane defined by both of the first-order diffracted light beams 51 and 56. With this deflector, isolation is remarkably improved between the first-order diffracted light beams. Sprious light beams are readiliy removed, if an optical sensor is located on the specific plane defined by the first-order diffracted light beams.

Inasmuch as the angles $\theta_1$ and $\theta_2$ of the incident light beam 11 may be changed by the adjusting mechanism, as described before, various light beams having different wavelengths may be incident to the illustrated deflector.

When the acoustic medium 10 is composed of a material, such as tellurite glass, in which a figure of merit is not substantially dependent on a direction of a polarization plane of the incident light beam 11, intensities of two output beams do not vary with optical rotation thereof and the directions of polarization planes of the output beams are kept unchanged between the incident and the output beams.

Figure 4:
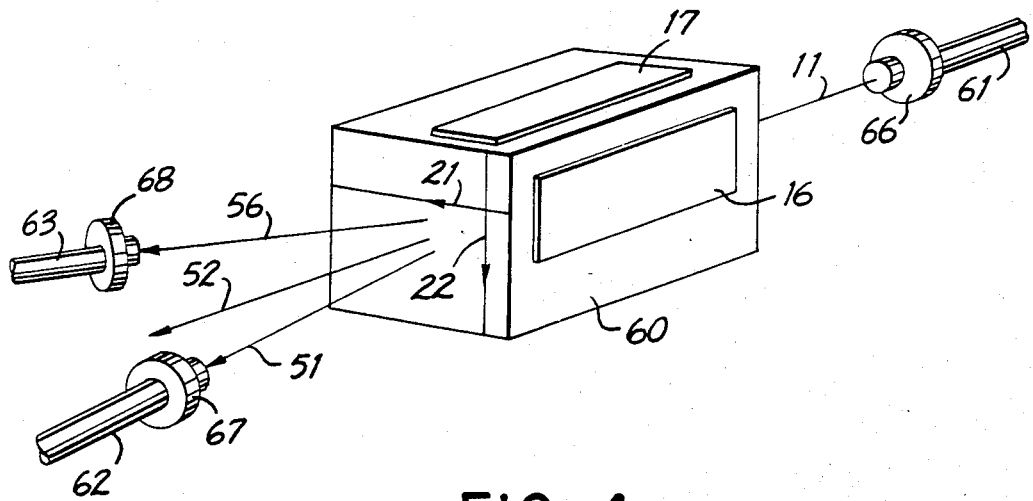
FIG. 4 is a perspective view of a light beam deflector according to a second embodiment of this invention.

Referring to FIG. 4, a light beam deflector according to another embodiment of this invention comprises a deflecting element 60 similar in structure to that illustrated in FIG. 2. The light beam deflector further comprises a first optical fiber 61 optically coupled to the deflector element 60 for providing the incident light beam 11 and second and third optical fibers 62 and 63 for receiving the first-order diffracted light beams 51 and 56, respectively. The first optical fiber 61 is attached to a case or panel (not shown) by the use of a connector 66 to define a direction of the incident light beam 11. On the other hand, the second and the third optical fibers 62 and 63 are fixed to another case or panel (not shown also) by connectors 67 and 68. The second and the third optical fibers 62 and 63 are located on paths of the first-order diffracted light beams 51 and 56 to define directions thereof.

In this structure, the incident light beam 11 is emitted to the deflector element 60 at the afore-mentioned Bragg angles through the first optical fiber 61 and is selectively diffracted by the first and the second acoustic waves 21 and 22 propagated from the first and the second electroacoustic transducers 16 and 17, respectively. Consequently, the first-order diffracted light beams 51 and 56 are selectively received by the second and the third optical fibers 62 and 63, respectively. Thus, it is possible to completely remove the spurious light beams, such as the zeroth-order light beam, by the use of the optical fibers.

With the light beam deflector according to each embodiment of this invention, isolation is considerably improved between two output light beams appearing as the first-order diffracted light beams 51 and 56. In addition, working of the acoustic medium 10 is readily possible when the medium 10 is of a parallelpiped. It is possible to reduce a distance between the incident and the output surfaces as compared with the conventional deflector illustrated in FIG. 1. Therefore, the light beam deflector according to this invention is inexpensive and compact in comparison with the conventional one.

While this invention has thus far been described in conjunction with a few embodiments thereof, it is readily possible for those skilled in the art to put this invention into practice in various manners. For example, the acoustic medium 10 may be a quartz, an acousto-optic crystal, or water in a container transparent to the incident light beam. An angle between the first and the second side surfaces 36 and 37 may be somewhat greater than the right angle. An angle between the third and the fourth side surfaces 38 and 39 may not be the right angle to absorb the acoustic waves. In this sense, the acoustic medium 10 may be of a hexahedral shape. The acoustic absorber 24 may be of a material having an acoustic impedance approximate to that of the acoustic medium 10. In order to control $\theta_1$ and $\theta_2$, the acoustic medium 10 may be moved or a mirror may be used.

What is claimed is:

1. A light beam deflector comprising a beam generating means for generating an incident light beam having a polarization plane, an acoustic medium having an incident surface for said incident light beam and an output surface for a first and a second output light beam, and acoustic wave supplying means coupled to said acoustic medium for selectively supplying said acoustic medium with first and second acoustic waves having first and second acoustic wave fronts, respectively, said deflector acting to deflect said incident light beam into either one of said first and said second output light beams in response to said first and said second acoustic waves, respectively, said acoustic medium comprising:

an acoustooptic hexahedral body of tellurite glass having said incident and said output surfaces opposite to each other and first, second, third, and fourth side surfaces laid between said incident and said output surfaces, said first side surface being contiguous to said second and said fourth side surfaces and opposite to said third side surface, said acoustooptic hexahedral body having a figure of merit which does not substantially depend on a direction of said polarization plane;

said wave supplying means comprising:

producing means for selectively producing first and second electrical signals;

a first electroacoustic transducer attached to said first side surface and responsive to said first electrical signal for propagating said first acoustic wave into said body; and a second electroacoustic transducer attached to said second side surface and responsive to said second electrical signal for propagating said second acoustic wave into said body to make said second acoustic wave front intersect said first acoustic wave front at a substantially right angle;

said beam generating means comprising:

beam supply means for supplying said incident light beam to said body with said incident light beam inclined to said first and said second acoustic wave fronts at the Bragg angles determined by said incident light beam and said first and said second acoustic waves.

2. A light beam deflector as claimed in claim 1, said incident light beam being propagated along an optical axis, wherein said first output light beam and said optical axis is present on a first plane while said second light beam and said optical axis is present on a second plane substantially perpendicular to said first plane.

3. A light beam deflector as claimed in claim 1, further comprising:

output beam receiving means for receiving said first and said second output beams on said first and said second planes, respectively.

4. A light beam deflector as claimed in claim 1, wherein said third and said fourth side surfaces are covered with an acoustic absorber.

* * * * *